T. J. CORDES.
AUTO LIFT.
APPLICATION FILED APR. 7, 1920.

1,401,463.

Patented Dec. 27, 1921.
2 SHEETS—SHEET 1.

Inventor
T. J. Cordes

T. J. CORDES.
AUTO LIFT.
APPLICATION FILED APR. 7, 1920.
1,401,463.
Patented Dec. 27, 1921.
2 SHEETS—SHEET 2.
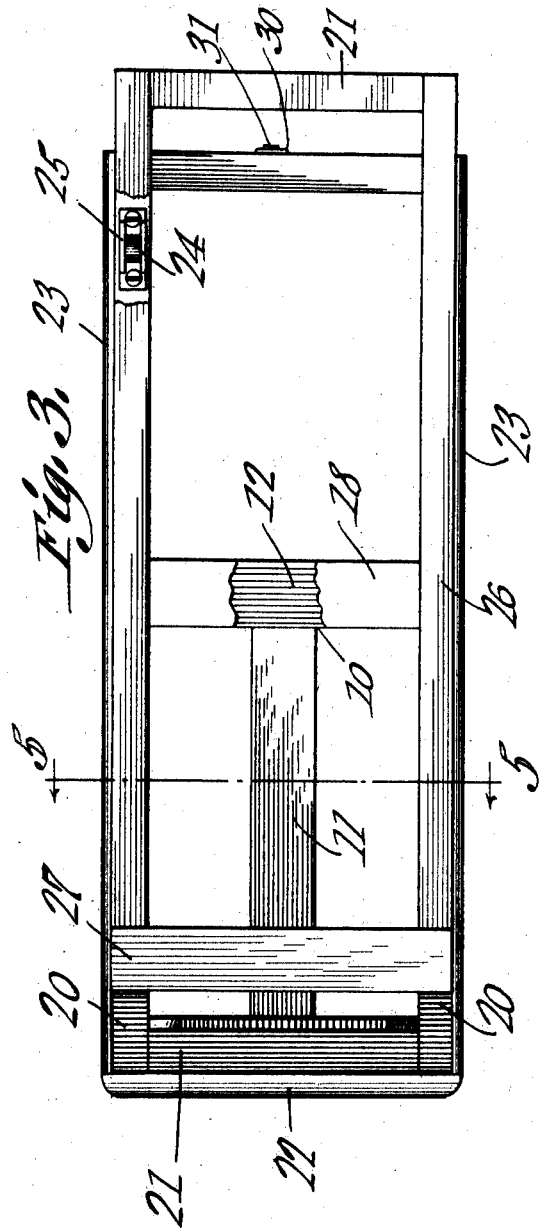
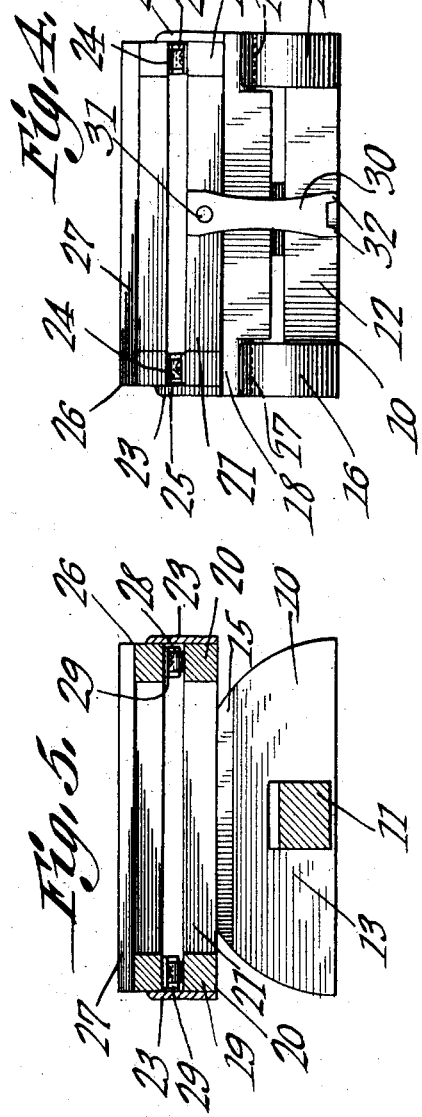
Inventor
T. J. Cordes
Witness

UNITED STATES PATENT OFFICE.

TOBIAS J. CORDES, OF SAN FRANCISCO, CALIFORNIA.

AUTO-LIFT.

1,401,463.  Specification of Letters Patent.  Patented Dec. 27, 1921.

Application filed April 7, 1920. Serial No. 372,017.

*To all whom it may concern:*

Be it known that I, TOBIAS J. CORDES, a citizen of the United States, residing at San Francisco, in the county of San Francisco and State of California, have invented a new and useful Auto-Lift, of which the following is a specification.

This invention relates to an improved automobile lift or jack, designed for raising an automobile off of the wheels or tires thereof in a garage or when not in use, so as to relieve tires of the weight of the automobile, thereby saving the tires of wear, and facilitating access to the parts beneath the chassis of the automobile, for cleaning, repairing and the like.

The invention aims to produce a simple and practical device of the above character, which permits the automobile to be driven onto and off of the same with facility, the device being strong, durable and capable of being economically produced for use.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:

Figure 1 is a side elevation of my improved automobile lift or jack in use;

Fig. 2 is a longitudinal sectional view thereof showing the device in position for driving the automobile onto the same;

Fig. 3 is a plan view of the device with the parts in position prior to assuming that final relative positions and parts being broken away;

Fig. 4 is a rear end view; and

Fig. 5 is a transverse sectional view taken on the line 5—5 of Fig. 3.

Referring to the drawings in detail, in which like reference characters designate corresponding parts throughout the several views, my improved automobile lifter or jack, is shown as embodying a stationary or base section 10 comprising a frame substantially I-shaped in plan and including a longitudinal central section 11 and a transverse end section 12 connected to the former intermediately of its ends, thus producing a substantially T-shaped member to which the forward cross member or beam 13 is intermediately connected, so as to dispose the central longitudinal member 11 in an inclined position, elevated toward the front end. That is, the forward end of the member or section 11 is spaced from the ground line as indicated at 14, and the forward cross member 13 is of oppositely sloping or tapered formation and provided at the top thereof, with a cushion or pad 15 adapted to absorb shock and jar.

To the extremities of the rear cross member 12, are connected longitudinally extending spaced parallel bearing heads 16 which like the cross member 13, are enlarged toward their base portion being oppositely tapered or sloping at the ends thereof and provided in their top portions, with bearing recesses or open bearings 17.

Pivotally engaged in the bearing recesses is a transverse pivot 18 in a form of a cross member disposed intermediately of the ends of a pivoted frame or section 19, the latter being intermediately enlarged, and the ends of said cross member forming trunnions disposed within the recesses for free pivotal movement in a limited arc. The frame 19 is in the form of an open oblong frame having spaced parallel sides 20 and parallel end portions 21 suitably connected to form a rigid structure or platform which is provided at the front end with a bumper or flange 22 extending vertically above the front portion 21, and side plates or flanges 23 also extending above the side members 20 and forming tracks upon the top surfaces of the side members 20 for receiving a movable section constituting the upper portion of the device thereon. Upon each side member 20 adjacent to the rear end portion thereof, at its top are disposed anti-friction members or rollers 24 preferably retained in bearings or brackets 25 suitably secured to or mounted upon said side members.

The upper movable or longitudinally slidable section is indicated generally at 26 and is also in the form of a rectangular open frame having a cross member or bumper 27 at the forward end thereof for a purpose to be hereinafter more fully explained. At the bottom portion of the movable section or top frame 26, are disposed anti-friction members or rollers 28 preferably mounted in bearings or brackets 29 secured to the lower faces of the side portions of the frame 26 adjacent to the forward ends thereof so as to bear on the tracks formed by the side portions 20 of the intermediate frame or section.

Thus, it will be observed that the anti-friction members or rollers 28 are normally engaged upon the tracks forwardly of the anti-friction members or rollers 24 and may travel longitudinally thereon limited by the abutment or stop member 22 at the forward end of the intermediate frame section 19. In using the device, the frame 19 is disposed in an inclined position as shown in Fig. 2, the pivot 18 allowing this, in order that the front thereof, will be raised from the cross member or bolster 13 while the rear end thereof will be in contact with the ground. The frame 26 will be disposed in a rearwardly inclined position upon the frame 19, the forward end thereof and the rollers 28, will be rearwardly displaced from the forward end of the intermediate or pivoted frame 19, with the rear end thereof, contact with the ground and the side portions spaced above the rollers 24. This is due to the overbalancing action which is assisted by the upper frame or section 26 so that when the car is driven onto the device, the front axle thereof will strike the bumper 27 and cause the upper frame 26 to move longitudinally of the intermediate frame 19 limited by contact with the stop member 22 at the forward end of the latter, when due to the distribution of the weight, the parts will move to the position shown in Fig. 1, when the front and rear axles will rest on the upper frame 26, held against forward or lateral movement. The side plates or flanges 23 will retain the rollers against displacement from upon the tracks and the device may be supported in this position by a strut or leg 30 preferably pivoted to the rear end of the intermediate frame 19 so as to be swung from a horizontal position in alinement with the end member 21 at the rear end of the frame 19, to a vertical position, as shown in Figs. 1 and 4 of the drawings. The pivot of the strut or leg 30 is designated at 31 and the lower end thereof is preferably made with prongs 32 so that it will be held from slipping. This action is rendered possible owing to the fact that the proper momentum may be acquired through the rear drive wheels, until they have left the ground and the car is supported as shown in Fig. 1 of the drawings. By folding the leg 31, the device may be tilted rearwardly for removing the car from the support or jack.

Having thus described the invention what I claim is:

In an automobile jack, a base section, a longitudinal central section extending from the base section, a forward cross member having connection with the longitudinal member, a pivoted frame carrying a pivot member mounted in the base, said pivoted frame having track sections, an upper slidable section carrying rollers movable in the track sections, the upper movable section being of a length equal to the length of the pivoted frame, one end of the upper movable section adapted to normally engage the ground surface on which the device is supported to restrict movement of the frame, and rollers carried by the pivoted frame and adapted to contact with the upper movable section.

In testimony that I claim the foregoing as my own, I have hereto affixed my signature in the presence of two witnesses.

TOBIAS J. CORDES.

Witnesses:
PETER J. SCHENKEL,
H. F. STOLZ.